(12) United States Patent
Thies

(10) Patent No.: US 8,362,109 B2
(45) Date of Patent: Jan. 29, 2013

(54) PENCIL LEAD FOR WRITING, DRAWING AND/OR PAINTING DEVICES

(75) Inventor: Andreas Thies, Effeltrich (DE)

(73) Assignee: J.S. Staedtler GmbH & Co. KG, Nürnberg (DE)

( * ) Notice: Subject to any disclaimer, the term of this patent is extended or adjusted under 35 U.S.C. 154(b) by 83 days.

(21) Appl. No.: 13/054,063

(22) PCT Filed: Jul. 11, 2009

(86) PCT No.: PCT/EP2009/005050
§ 371 (c)(1),
(2), (4) Date: Jan. 13, 2011

(87) PCT Pub. No.: WO2010/006742
PCT Pub. Date: Jan. 21, 2010

(65) Prior Publication Data
US 2011/0118383 A1    May 19, 2011

(30) Foreign Application Priority Data

Jul. 15, 2008   (DE) .......................... 10 2008 034 014

(51) Int. Cl.
*C09D 13/00*   (2006.01)
(52) U.S. Cl. ...................................................... 523/164
(58) Field of Classification Search .................... 523/164
See application file for complete search history.

(56) References Cited

U.S. PATENT DOCUMENTS

| 3,409,574 A | 11/1968 | Gros |
| 4,617,058 A | 10/1986 | Lee |
| 2006/0020055 A1* | 1/2006 | Krasnikov et al. ............. 523/164 |

FOREIGN PATENT DOCUMENTS

| DE | 3827968 | 12/1989 |
| DE | 3827968 A | 12/1989 |
| EP | 1302516 A | 4/2003 |
| EP | 1624036 | 2/2006 |
| GB | 461109 A | 2/1937 |

* cited by examiner

*Primary Examiner* — Vu A Nguyen
(74) *Attorney, Agent, or Firm* — Lucas & Mercanti, LLP; Klaus P. Stoffel

(57) ABSTRACT

A polymer-bonded pencil lead for writing, drawing, and/or painting devices, including at least one polymer binder, one wax, and at least one filler. The pencil lead includes 0.5 to 2.5% by weight palm oil.

12 Claims, No Drawings

PENCIL LEAD FOR WRITING, DRAWING AND/OR PAINTING DEVICES

The present application is a 371 of International application PCT/EP2009/005050 filed Jul. 11, 2009, which claims priority of DE 10 2008 034 014.6, filed Jul. 15, 2008, the priority of these applications is hereby claimed and these applications are incorporated herein by reference.

BACKGROUND OF THE INVENTION

The invention relates to polymer-bonded pencil leads for writing, drawing, and/or painting devices.

The principle of pencil leads of such kind for writing, drawing, and/or painting is known. Polymer-bonded, graphite-based pencil leads for writing, drawing, and/or painting are understood to be leads that are solidly embedded in wood or other materials that are capable of being sharpened, and also leads that are retained in sliding manner inside a rigid enclosure. Examples of such are wood-encased pencils and pencil leads for mechanical pencils, also known as propelling pencils or clutch pencils, for example. In this context, the pencil leads usually have an outer diameter from about 0.3 mm to 6 mm.

Thus for example, polymer-bonded graphite pencil leads are known from German Patent No. DE 38 27 968 C1. Unfired pencil leads of this kind contain a polymer binder, lubricant and filler materials.

One of the problems in producing such leads is that with a high filler content of greater than 50% by weight, the writing and painting properties of such articles are very good, but the viscosity of the lead paste during extrusion is extremely high, and the extrusion pressure required in the tool and the extruder assumes very large values. The head pressure is about 350 bar. The effect of this is disadvantageous in that the extruder must be larger, and complex equipment must be used. The service life of the machines and tools is also significantly shortened by the high extrusion pressure.

SUMMARY AND DESCRIPTION OF THE INVENTION

The object of the invention is therefore to produce a pencil lead for writing, drawing, and/or painting that is not associated with the disadvantages described above, and which may be produced using low extrusion pressure.

The object is solved for the polymer-bonded pencil lead for writing, drawing, or painting devices, particularly for pencils and coloured pencils including at least one polymer binder, at least one wax, and at least one filler material, in that the pencil lead also contains 0.1 to 5% by weight palm oil.

Surprisingly, it has been revealed that the deliberate use of palm oil as a constituent of the pencil lead represents the addition of a lubricant to the recipe, as a result of which it is possible to lower the extrusion pressure in the extruder significantly. In particular, the palm oil additive in the pencil lead composition serves to lower the pressing and extrusion pressure at the orifice or head of the extruder during extrusion. In this pressure becomes lower as more and more palm oil is added, and a reduction of pressure by at least 30%, and particularly by at least 50% is achieved compared with conventionally extruded pencil lead compositions.

It has been revealed that other natural or synthetic oils also have the effect of lowering the pressure in the extruder, but that they also have a disproportionately limiting effect on the rigidity of the extruded lead. Surprisingly, this is not the case when palm oil is used, since the pressure in the extruder is low yet the required degree of rigidity of the pencil lead still exists.

The typical fatty acid distribution of palm oil is composed as follows:

| | |
|---|---|
| C12: Lauric acid | 0-1% |
| C14: Myristic acid | 0-3% |
| C16: Palmitic acid | 36-47% |
| C18: Stearic acid | 2-8% |
| C18: Oleic acid | 36-42% |
| C18: Linoleic acid | 7-12% |
| C18: Linolenic acid | 0-1% |
| Other: | Max. 1% |

In addition, the palm oil lends a more intense colour property to the impression left by the lead and improves its sliding behaviour when writing. In pencil leads, the line drawn is full with high optical density, while coloured pencil leads create rich, lustrous shades.

The palm oil component is in the range from 0.1 to 5% by weight, particularly in the range from 0.5 to 2.5% by weight of the pencil lead composition. If the palm oil content is increased above the limit of 5% by weight, the rigidity of the lead is reduced disproportionately even when palm oil is used. The leads then tend to splinter or break during use.

The waxes used are malleable at 20° C., have firm to brittle hardness, a coarse to fine crystalline structure, are translucent to opaque, but not glassy, and they melt without decomposition above 40° C. They are readily flowable slightly above their melting point and their consistency and solubility are strongly dependent on temperature.

The polymer-bonded pencil leads according to the invention are unfired pencil leads that are usable immediately after extruding without further heat treatment or impregnation.

Advantageous embodiments are described in the subordinate claims.

It has proven advantageous if the polymer-bonded pencil lead consists of

| | |
|---|---|
| 10 to 30% by weight | Polymer binder |
| 2 to 25% by weight | Wax |
| 0.1 to 5% by weight | Palm oil and |
| Remainder | Filler(s) |

It is particularly preferred if the polymer-bonded pencil lead consists of

| | |
|---|---|
| 15 to 25% by weight | Binder |
| 4 to 20% by weight | Wax |
| 0.5 to 2.5% by weight | Palm oil and |
| Remainder | Filler(s) |

It has proven advantageous if the at least one binder is constituted from at least one polymer of the group including polystyrene (PS), styrene acrylonitrile (SAN), styrene butadiene (SB), polyolefins (PO) and acrylonitrile-butadiene-styrene (ABS).

Mixtures of two or more binders may also be used.

It has also proven advantageous if the at least one wax is constituted from at least one wax from the group including stearates, montan waxes, amide waxes, and paraffins.

Mixtures of two or more waxes may also be used. In this context, it is particularly preferable if the at least one wax consists of calcium stearate or includes calcium stearate.

The at least one filler is advantageously constituted from at least one filler from the group including graphite, carbon black, hexagonal boron nitride, layered silicates, chalk, heavy spar, coloured pigments, achromatic pigments.

In this context, particularly graphite or graphite in combination with carbon black are preferred as colourising pigments for pencil leads. For coloured pencil leads, combinations of white or achromatic fillers such as hexagonal boron nitride, layered silicates and similar with colourising pigments such as azo pigments, pthalocyanines, dioxazines, quinacridones, iron oxides, carbon black, graphites, ultramarine, and iron-cyan complexes have proven most advantageous.

A preferred composition for a pencil lead consists of:

| | |
|---|---|
| 15 to 25% by weight | Binder |
| 4 to 12% by weight | Wax |
| 0.5 to 2% by weight | Palm oil and |
| Remainder | Graphite or graphite and carbon black |

In particular, a pencil lead includes:

| | |
|---|---|
| 15 to 25% by weight | Polystyrene (PS) |
| 4 to 12% by weight | Calcium stearate |
| 0.5 to 2% by weight | Palm oil and |
| Remainder | Graphite or graphite and carbon black |

An exemplary recipe 1 for a pencil lead consists of:

| | |
|---|---|
| Polystyrene (PS) | 21% by weight |
| Calcium stearate | 6% by weight |
| Palm oil | 1.0% by weight |
| Graphite | Remainder |

The following table shows the reduction of extrusion pressure in the extruder head during production of a pencil lead according to the invention in accordance with recipe 1 compared with a pencil lead that is extruded according to the prior art.

| | Pencil lead recipe 1 | Pencil lead according to the prior art |
|---|---|---|
| Pressure in the extruder head (in bar) | <200 | 350-450 |

From this, it is evident that pencil leads that have been designed on the basis of the composition according to the invention require significantly lower extrusion pressures for their production. Machinery and tool service life is prolonged and the machine configuration is simplified.

An exemplary recipe 2 for a pencil lead consists of:

| | |
|---|---|
| Styrene acrylonitrile (SAN) | 15% by weight |
| Aluminium stearate | 10% by weight |
| Palm oil | 2% by weight |
| Graphite | Remainder |

A preferred composition for a coloured pencil lead consists of:

| | |
|---|---|
| 15 to 25% by weight | Binder |
| 4 to 12% by weight | Wax |
| 0.5 to 2% by weight | Palm oil and |
| Remainder | Layered silicate(s) and/or hexagonal boron nitride and at least one coloured pigment and/or one achromatic pigment |

In particular, a coloured pencil lead includes:

| | |
|---|---|
| 15 to 25% by weight | Polystyrene |
| 4 to 12% by weight | Montan wax |
| 0.5 to 2% by weight | Palm oil and |
| Remainder | Talcum and/or hexagonal boron nitride and at least one coloured pigment and/or one achromatic pigment |

Extrusion has proven to be effective as the method for producing a polymer-bonded pencil lead according to the invention.

The pencil lead according to the invention is produced particularly by carrying out the steps listed in the following:
- Mixing and granulating all recipe components of the pencil lead to produce a pencil lead granulate;
- Extruding a pencil lead granulate in an extruder at a temperature in the range from 130 to 200° C. through a suitable orifice to form endless pencil lead strands;
- Cooling and solidifying the endless pencil lead strand; and
- Cutting the enless pencil lead strand to final length, particularly the required pencil length.

The pencil lead cross section may have any shape depending on the extrusion head—round, angular or a combination thereof. It is also possible to combine different pencil lead recipes in one extrusion head to create a multicomponent pencil lead by multiple coextrusion.

The invention claimed:

1. A polymer-bonded pencil lead for writing, drawing, and/or painting devices, comprising: at least one polymer binder; one wax; and at least one filler, wherein the pencil lead includes 0.5 to 2.5% by weight palm oil.

2. The polymer-bonded pencil lead according to claim 1, wherein the pencil lead contains

| | |
|---|---|
| 10 to 30% by weight | Polymer binder |
| 2 to 25% by weight | Wax |
| 0.5 to 2.5% by weight | Palm oil and |
| Remainder | Filler(s). |

3. The polymer-bonded pencil lead according to claim 1, wherein the pencil lead contains

| | |
|---|---|
| 15 to 25% by weight | Binder |
| 4 to 20% by weight | Wax |
| 0.5 to 2.5% by weight | Palm oil and |
| Remainder | Filler(s). |

4. The polymer-bonded pencil lead according to claim 1, wherein the at least one binder is constituted from at least one polymer of the group consisting of polystyrene (PS), styrene acrylonitrile (SAN), styrene butadiene (SB), polyolefins (PO) and acrylonitrile-butadiene-styrene (ABS).

5. The polymer-bonded pencil lead according to claim 1, wherein the at least one wax is constituted from at least one wax from the group consisting of stearates, montan waxes, amide waxes, and paraffins.

6. The polymer-bonded pencil lead according to claim 5, wherein the at least one wax consists of calcium stearate or includes calcium stearate.

7. The polymer-bonded pencil lead according to claim 1, wherein the at least one filler includes at least one filler from the group consisting of graphite, carbon black, hexagonal boron nitride, layered silicates, chalk, heavy spar, coloured pigments and/or achromatic pigments.

8. The polymer-bonded pencil lead according to claim 1, wherein the lead is a pencil lead and includes

| | |
|---|---|
| 15 to 25% by weight | Binder |
| 4 to 12% by weight | Wax |
| 0.5 to 2% by weight | Palm oil and |
| Remainder | Graphite or graphite and carbon black. |

9. The polymer-bonded pencil lead according to claim 8, wherein the lead is a pencil lead and includes

| | |
|---|---|
| 15 to 25% by weight | Polystyrene |
| 4 to 12% by weight | Calcium stearate |
| 0.5 to 2% by weight | Palm oil and |
| Remainder | Graphite or graphite and carbon black. |

10. The polymer-bonded pencil lead according to claim 1, wherein the lead is a coloured pencil lead and includes

| | |
|---|---|
| 15 to 25% by weight | Binder |
| 4 to 12% by weight | Wax |
| 0.5 to 2% by weight | Palm oil and |
| Remainder | Layered silicate(s) and/or hexagonal boron nitride and at least one coloured pigment and/or one achromatic pigment. |

11. The polymer-bonded pencil lead according to claim 1, wherein the lead is a coloured pencil lead and includes

| | |
|---|---|
| 15 to 25% by weight | Polystyrene |
| 4 to 12% by weight | Montan wax |
| 0.5 to 2% by weight | Palm oil and |
| Remainder | Talcum and/or hexagonal boron nitride and at least one coloured pigment and/or one achromatic pigment. |

12. A method for producing a polymer-bonded pencil lead as recited claim 1, including the step of extruding the pencil lead.

* * * * *